United States Patent [19]

Ohtsuki

[11] Patent Number: 5,077,654

[45] Date of Patent: Dec. 31, 1991

[54] VIRTUAL MACHINE SYSTEM WHICH TRANSLATES VIRTUAL ADDRESS FROM A SELECTED VIRTUAL MACHINE INTO REAL ADDRESS OF MAIN STORAGE

[75] Inventor: Toru Ohtsuki, Hadano, Japan

[73] Assignee: Hitachi, Ltd., Tokyo, Japan

[21] Appl. No.: 281,334

[22] Filed: Dec. 8, 1988

[30] Foreign Application Priority Data

Dec. 11, 1987 [JP] Japan .................. 62-313608

[51] Int. Cl.$^5$ .................. G06F 12/10; G06F 9/44
[52] U.S. Cl. .................. 395/800; 364/256.3; 364/228.2; 364/978.1; 364/978; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,285,040 | 8/1981 | Carlson et al. | 364/200 |
| 4,456,954 | 6/1984 | Bullions, III et al. | 364/200 |
| 4,533,996 | 8/1985 | Hartung et al. | 364/200 |
| 4,782,443 | 11/1988 | Matsumoto | 364/200 |
| 4,792,895 | 12/1988 | Tallman | 364/200 |
| 4,792,897 | 12/1988 | Gotou et al. | 364/200 |
| 4,802,084 | 1/1989 | Ikegaya et al. | 364/200 |
| 4,816,991 | 3/1989 | Watanabe et al. | 364/200 |
| 4,885,681 | 12/1989 | Unemo et al. | 364/200 |
| 4,959,770 | 9/1990 | Kondo et al. | 364/200 |

OTHER PUBLICATIONS

P. H. Gum, "System/370 Extended Architecture: Facilities for Virtual Machines", IBM Journal of Research and Development, vol. 27, No. 6, pp. 529-544, Nov. 1983.

*Primary Examiner*—Thomas C. Lee
*Assistant Examiner*—Mehmet Geckil
*Attorney, Agent, or Firm*—Antonelli, Terry, Stout & Kraus

[57] ABSTRACT

A virtual machine system for executing fast speed address translation in plural virtual machines having a two-stage address translation mechanism. The system permits address translation to be executed by adding to an output from a first address translation address constants in a hold apparatus holding address constants including zero, executing a second address translation, and selecting an output from the first address translation to which the address constants have been added or an output from the second address translation. An address translation for a plurality of different regions is performed by switching a value for the address constants held by the hold apparatus.

6 Claims, 2 Drawing Sheets

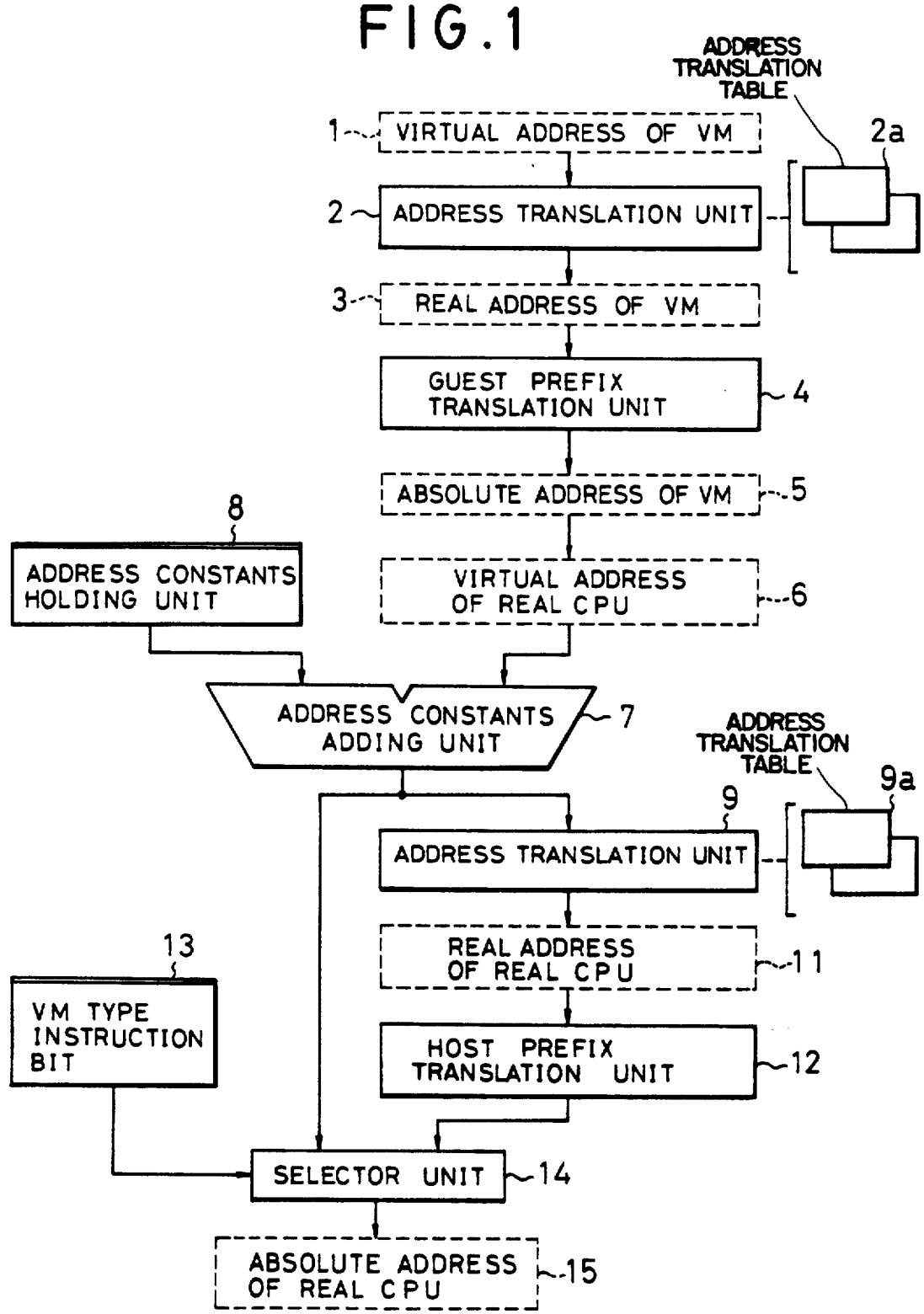

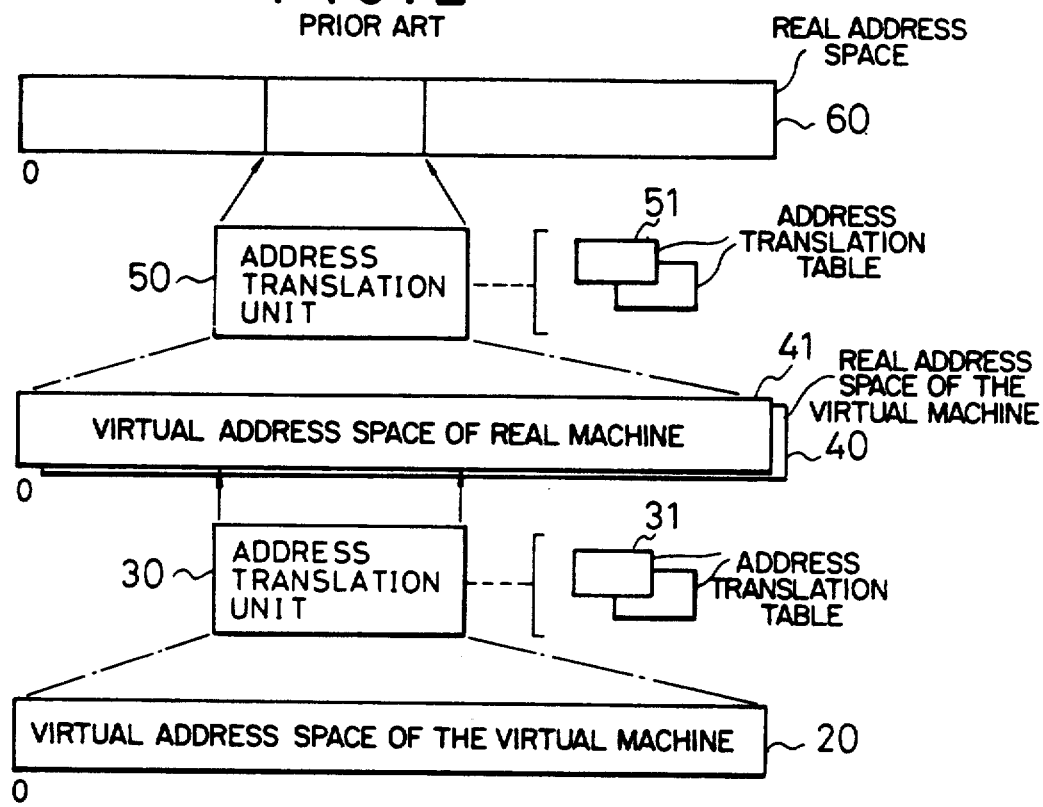
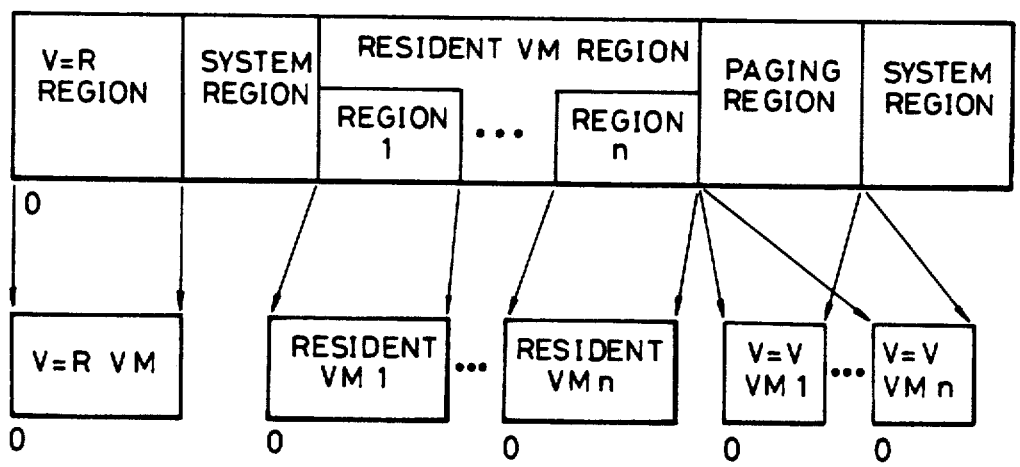

VIRTUAL MACHINE SYSTEM WHICH TRANSLATES VIRTUAL ADDRESS FROM A SELECTED VIRTUAL MACHINE INTO REAL ADDRESS OF MAIN STORAGE

BACKGROUND OF THE INVENTION

The present invention relates to a virtual machine system and, more particularly, to a virtual machine system adapted to perform an address translation at fast speeds in plural virtual machine systems.

A virtual machine system is a computer system to control one real machine as if plural computer machines (virtual machines) are present on one real computer machine (real machine). In the virtual machine system, a host control program (virtual machine control program: VMCP) controls a resource of one real machine, generating plural virtual machines (hereinafter referred to as VM) on the host control program. A memory of the VM is allocated at a predetermined area on a main storage of the real machine generated in accordance with an address translation table formed by the host control program on the main storage thereof. When a guest OS (guest operating system) that is an operating system on the VM implements a virtual memory control system, a virtual address space managing the guest OS is allocated at a region on the memory of the VM in accordance with an address translation table generated by the guest OS on the memory of the VM.

Accordingly, in order to allocate one page of a virtual memory of the guest OS at an area of the main storage of a real machine, an address translation is executed in two stages using the address translation table of the guest OS and the address translation table of the host control program. As shown in FIG. 2, a virtual address space 20 of the VM is translated to a real address space 40 of the VM by causing an address translation unit 30 to execute address translation using an address translation table 31. The real address space 40 of the VM is the same as a virtual address space 41 of the real machine in the host control program. Then the virtual address space 41 of the real machine is translated to a real address space 60 by causing an address translation unit 50 to execute address translation with an address translation table 51 of the host control program. As have been described hereinabove, the address translation is executed in two stages, thus allocating from the virtual address space 20 of the VM to the real address space 60 of the real machine. However, this delays address translation speed in the virtual machine system.

In order to make the virtual machine system to work at fast speeds, a mechanism for the two-stage address translation is implemented as a hardware mechanism, as has been discussed in "IBM System/370 Extended Architecture Interpretive Execution (SA22-7095-0) First Edition, January 1984."

The hardware mechanism for executing the address translation of the VM realizes [Virtual (V) = Real (R)] VM (preferred guest) as one of hardware facility, which is one mechanism capable of operating only one VM at fast speeds. In allocating the memory of the VM in the main storage of the real machine, this mechanism equalizes its address to a low-order address starting from zero of the main storage of the real machine, permitting a continuous permanent allocation. This may render the address translation and the paging process unnecessary, thus realizing a fast speed operation of the VM. Accordingly, only one [V = R]VM can be realized in the system by using the mechanism.

An alternative technique for fast speed operation is a resident VM technique for operating plural VMs at fast speeds. For example, as shown in FIG. 3, this technique permits a continuous permanent allocation on the main storage of the real machine other than a V = R region by providing a resident VM region in allocating the memory of the VM to the main storage of the real machine. An address of the main storage of the real machine in which the memory of the VM is allocated is equivalent to an addition of a first address in a region in which the resident VM is allocated to an address on the memory of the VM. Such resident VM does not require paging process by a host control program like [V = R]VM, thus allowing the address translation to be executed at fast speeds. As this technique for the fast speed processing is realized by a software means, there is required an address translation, more specifically, an address addition.

Conventional virtual machine systems are provided with a hardware mechanism for the fast speed processing, however, this mechanism is to execute only one VM ([V = R]VM) at fast speeds without any mechanism for executing plural VMs at fast speeds.

As a mechanism for executing plural VMs is one that realizes a function (resident VM) executing plural VMs at fast speeds to some extent using a one stage address translation mechanism. Although this mechanism is realized by a software means of a control program, a limit is produced upon efficiency in the fast speed processing.

SUMMARY OF THE INVENTION

The present invention has the object to provide a virtual machine system adapted to realize a mechanism for executing plural resident VMs equivalent to each other in fast speed processing and a control method for the mechanism, and to minimize an increase in hardware amounts required.

In order to achieve the object, the present invention consists of a virtual machine system with a two stage address translation mechanism which comprises a first address translation means for executing a first phase address translation, a second address translation means for performing a second phase address translation in response to an output from the first address translation means, a selection means for selecting an output from the first address translation means or an output from the second address translation means, and an instruction means for providing the selection means with a selection instruction. In such a virtual machine system as having a two-stage address translation mechanism, there are provided a hold means for holding address constants including zero and an addition means for making an output from the first address translation means a first input and an output from the hold means a second input, and a value held by the hold means is switched using an output from the addition means as an input to the second address translation means and as a first input to the selection means, thus performing an address translation of plural different regions.

With this arrangement, the address translation including an address addition for realization of a resident VM is executed by a hardware mechanism, thus permitting a fast speed address translation in the VM. In the address translation of VMs of plural kinds, the switching of mechanisms for address translation including address addition permits a fast speed address translation in the VM. In particular, by handling [V=R]VM as a resident VM in which a regional first address is allocated to zero, the address translation mechanisms can be used uniformly, thus suppressing an increase in required hardware amounts to a minimum extent.

Other objects and features of the present invention will become apparent in the course of a description of following preferred embodiments in conjunction with drawings appended hereto.

BRIEF DESCRIPTION OF THE DRAWINGS

FIG. 1 is a block diagram for explaining address translation of a virtual machine system as one example according to the present invention.

FIG. 2 is a diagram for address translation in the virtual machine system.

FIG. 3 is an address space map showing one example of allocation of memory regions in the virtual machine system.

DESCRIPTION OF THE PREFERRED EMBODIMENTS

In the virtual machine system, a two stage address translation is generally required in executing a guest OS on the VM, as have been described hereinabove. If a type of VM is a [V=V]VM, a process for translating an address in a virtual address space generated by the guest OS on the VM to an address of the main storage of a real CPU corresponding thereto is executed in the following way.

Referring to FIG. 1, a virtual address 1 of VM is translated to a real address 3 of the VM with reference to an address translation table 2a of the guest OS by an address translation unit 2. The real address 3 of the VM is then translated into the prefix address by a guest prefix translation unit 4, thus yielding an absolute address 5 of the VM. The absolute address 5 of the VM is equivalent to a virtual address 6 of the real CPU (a virtual address of a real machine). To the virtual address 6 of the real CPU is added a bottom address in a host virtual address space in a paging region in which there is allocated [V=V]VM to be held in an address constant holding unit 8 using an address constants adding unit 7, thus providing an input to an address translation unit 9. This is then translated to a real address 11 of the real CPU by the address translation unit 9 with reference to an address translation table 9a of a host control program. The real address 11 of the real CPU is then subjected to the prefix translation by a host prefix translation unit 12. A selector unit 14 that is a selection means sets a VM type instruction bit 13 at a value of "0" indicative of the [V=V]VM, thus selecting a second output and translating an output from the prefix translation unit 12 to an absolute address 15 of the real CPU.

If the type of VMs is a resident VM, an address of a virtual address space generated on the VM by the guest OS is translated to an address in the main storage of the real CPU corresponding thereto in the following way. A virtual address of the VM is translated to an absolute address of the VM in the same manner as in the case of the [V=V]VM. In the resident VM, a translation of a memory address of the VM to an address of a real memory of a host is executed by addition of a bottom address in a region on the real memory of the host in which the resident VM is allocated. At this end, a bottom address in a region on the real memory of the real CPU in which the resident VM is allocated is set in the address constants holding unit 8. This is an absolute address of the real CPU including zero. The VM type instruction bit 13 is set at a value "1" indicative of the resident VM. Then the selector unit 14 selects and outputs the first input, then translating an output itself of the address constants adding unit 7 to an absolute address 15 of the real CPU. This allows a resident VM including a conventional [V=R]VM to provide an absolute address of the host from a virtual address of the VM by automatically executing an address translation once and an address constants addition once with a hardware without the aid of a software, thus permitting a fast speed address translation.

Furthermore, one kind of a hardware can permit a conventional [V=R]VM and resident VM to be operated at fast and uniform speeds by setting in the address constants holding unit 8 a bottom address in a region on the real memory of the host in which the resident VM is allocated whenever the VM is switched.

Although the present invention has been described by way of examples as have been described hereinabove, it should be understood that the present invention should not be interpreted in any respects to be limited to those examples and it contains various modifications and variations without departing from a scope of the spirit of the invention.

As have been described hereinabove, the present invention permits an address translation required for the execution of a guest OS on the VM by means of a hardware mechanism without the aid of a software and enables information required for a fast speed address translation of plural VMs to be set when the VM is switched, thus realizing a virtual machine system having an execution circumstance of plural VMs equivalent to each other in fast speed execution.

What is claimed is:

1. A virtual machine system for executing a plurality of different resident virtual machines and a usual virtual machine and translating a virtual address of a certain virtual machine into a real address of a main storage, comprising:

first address translation means, responsive to a virtual address of said certain virtual machine which is currently being executed, for executing a first stage address translation, said first address translation means including means for referring to a first address table to obtain a real address of said certain virtual machine;

second address translation means for executing a second stage address translation in response to an output from the first address translation means, said second address translation means including means for referring to a second address table to obtain a real address of the main storage;

selection means for selecting said output from said first address translation means or an output from said second address translation means to provide a selected output to said main storage;

instruction means, responsive to a kind of virtual machine currently being executed, for providing said selection means with a selection instruction directing said selection means to select said output from said first address translation means when said certain virtual machine is a resident virtual machine and with a selection instruction directing said selection means to select said output from said second address translation means when said certain virtual machine is a usual virtual machine;

hold means for holding an address constant which corresponds to said certain virtual machine, wherein virtual machines are uniquely and respectively assigned constants, said constants represent real addresses of said main storage and one of said constants whose value is zero is assigned to both one of the resident virtual machines and said usual virtual machine; and additional means, disposed in data communication between said first address translation means, said second address translation means and said selection means, for inputtting said output from said first address translation means and said output from said second address translation means, adding said outputs from said first and second address translation means and outputting a result of said addition to both said second address translation means and said selection means.

2. A virtual machine system as claimed in claim 1, further comprising:

control means for executing an address translation of plural different regions by switching a value for address constants held in said hold means.

3. A virtual machine system as claimed in claim 2, wherein the value for the address constants held in said hold means is a value corresponding to plural different regions for plural virtual machines.

4. A method for address translation of a virtual address of a certain virtual machine into a real address of a main storage in a virtual machine system for executing a plurality of different resident virtual machines and a usual virtual machine, comprising the steps of:

executing a first stage address translation, in response to a virtual address of said certain virtual machine which is currently being executed, by referring to a first address table to obtain a real address of said certain virtual machine;

executing a second stage address translation in response to a result from said executing a first stage address translation step by referring to a second address table to obtain a real address of the main storage;

selecting said result from said executing a first stage address translation step or a result from said executing a second stage addrees translation step to provide a selected output to said main storage;

providing, in response to a kind of virtual machine currently being executed, said selecting step with a selection instruction directing said selecting step to select said result from said executing a first stage address translation step when said certain virtual machine is a resident virtual machine and with a selection instruction directing said selecting step to select said result from said executing a second stage address translation step when said certain virtual machine is a usual virtual machine;

holding an address constant which corresponds to said certain virtual machine, wherein virtual machines are uniquely and respectively assigned constants, said constants represent real addresses of said main storage and one of said constants whose value is 0 is assigned to both one of the resident virtual machines and said usual virtual machine;

adding said results from said executing a first stage address translation step and said executing a second stage address translation step; and outputting a result of said adding step to both said executing a second stage address translation step and said selecting step.

5. A method as claimed in claim 4, wherein there is set a value corresponding to a plurality of different regions for executing address translation of the address constants including zero.

6. A method as claimed in claim 4, wherein a value for the address constants held in a hold means is a value corresponding to a plurality of different regions for plural virtual machines.

* * * * *